United States Patent
Suau et al.

(10) Patent No.: US 9,359,497 B2
(45) Date of Patent: Jun. 7, 2016

(54) METHOD FOR POLYMERISATION OF (METH)ACRYLIC ACID IN SOLUTION, POLYMER SOLUTIONS OBTAINED AND THEIR USES

(71) Applicant: COATEX, Genay (FR)

(72) Inventors: Jean-Marc Suau, Lucenay (FR); Christian Jacquemet, Lyons (FR); Jacques Mongoin, Quincieux (FR)

(73) Assignee: COATEX, Genay (FR)

( * ) Notice: Subject to any disclaimer, the term of this patent is extended or adjusted under 35 U.S.C. 154(b) by 0 days.

(21) Appl. No.: 14/745,585

(22) Filed: Jun. 22, 2015

(65) Prior Publication Data

US 2015/0284555 A1   Oct. 8, 2015

Related U.S. Application Data

(62) Division of application No. 14/037,622, filed on Sep. 26, 2013, now Pat. No. 9,150,722.

(60) Provisional application No. 61/709,173, filed on Oct. 3, 2012.

(30) Foreign Application Priority Data

Sep. 26, 2012   (FR) ...................... 12 59043

(51) Int. Cl.
 *C08L 33/10*   (2006.01)
 *C08F 20/06*   (2006.01)
 *C08F 2/38*   (2006.01)
 *C08L 33/02*   (2006.01)

(52) U.S. Cl.
 CPC . *C08L 33/02* (2013.01); *C08F 2/38* (2013.01); *C08F 20/06* (2013.01); *C08L 33/10* (2013.01)

(58) Field of Classification Search
 CPC ............. C08L 33/10; C08F 2/38; C08F 20/06
 See application file for complete search history.

(56) References Cited

U.S. PATENT DOCUMENTS

| 2007/0179262 A1* | 8/2007 | Suau ..................... C04B 24/161 526/217 |
| 2011/0033558 A1* | 2/2011 | Suau ..................... C08F 20/06 424/687 |
| 2011/0186773 A1 | 8/2011 | Suau et al. |
| 2012/0259083 A1 | 10/2012 | Suau et al. |

FOREIGN PATENT DOCUMENTS

WO   WO 2005/095466 A1   10/2005
WO   WO 2006/024706 A1   3/2006

OTHER PUBLICATIONS

International Search Report issued Nov. 19, 2013 in PCT/FR2013/052209 (with English translation of categories of cited documents).

* cited by examiner

*Primary Examiner* — Robert Harlan
(74) *Attorney, Agent, or Firm* — Oblon, McClelland, Maier & Neustadt, L.L.P.

(57) ABSTRACT

The present invention relates to a new solvent-free preparation method of a (meth)acrylic acid polymer in solution, where said polymer has a molecular weight less than 8,000 g/mol and a polydispersity IP index between 2 and 3 by radical polymerization, the polymers obtained by this means, and their applications in industry.

17 Claims, No Drawings

METHOD FOR POLYMERISATION OF (METH)ACRYLIC ACID IN SOLUTION, POLYMER SOLUTIONS OBTAINED AND THEIR USES

REFERENCE TO PRIOR APPLICATIONS

This application is a division of U.S. application Ser. No. 14/037,622, filed Sep. 26, 2013; which claims priority to U.S. provisional application Ser. No. 61/709,173, filed Oct. 3, 2012; and to French patent application 12 59043, filed Sep. 26, 2012, all incorporated herein by reference.

The present invention relates to the technical field of radical polymerisation of (meth)acrylic acid. More specifically, the present invention relates to a new method for radical polymerisation, the polymers obtained by this means and their applications in industry.

Radical polymerisation methods conventionally require that a chain transfer agent, a source of free radicals, and optionally, a catalyst, are brought into contact in at least one solvent of monomers to be polymerised.

The principal goal when a polymerisation method is concerned is to obtain a polymer which has a molecular weight suitable for the application for which it is intended. The aim of the present invention is to obtain polymers of molecular weight less than 8,000 g/mol, for example of about 6,000 g/mol.

Different methods of radical polymerisation exist.

The methods which use organic solvents, for example secondary alcohols such as isopropanol, may firstly be mentioned. These methods are currently not satisfactory since they generate volatile organic compounds (VOC). On the one hand, it is necessary to eliminate these solvents at the end of the reaction, which makes the industrial process of a polymer preparation more complex. On the other hand, the health and environment effects of these solvents are known to be very harmful, so that we try to avoid producing them. Lastly, even after purification (distillation), traces of solvent still remain in the polymer solution.

Other methods for synthesizing polyacrylic polymers exist which take place in water, and which do not generate volatile organic compounds.

In these methods, we may use hydrogen peroxide, which plays the role of initiator, as well as, for example, copper sulphate, which plays the role of catalyst, and of chain transfer agent. Nonetheless, to obtain a polymer which has a molecular weight less than 8,000 g/mol, for example of about 6,000 g/mol, substantial quantities of catalyst must be added, which generates substantial quantities of polluting by-products.

Alternatively, thiolactic acid, or another RSH mercaptan is used, as an additional chain transfer agent but, once again, to obtain a polymer with a molecular weight less than 8,000 g/mol, for example of about 6,000 g/mol, substantial quantities of thiolactic acid, or more generally of transfer agent, must be added.

Still other methods use sodium hypophosphite, of chemical formula $NaPO_2H_2$, as a chain transfer and oxidation-reduction agent, in the presence of hydrogen peroxide or radical generator. This has the major disadvantage of requiring large amounts of sodium hypophosphite, a fraction of the phosphorus being found grafted in the polymer, and another fraction of the phosphorus being found as phosphate salts in the process waters. This constitutes firstly a disadvantage when using the polymer, and secondly a pollutant for the environment.

Among the various methods of radical polymerisation, controlled radical polymerisation of RAFT (Reversible Addition Fragmentation chain Transfer) type may also be mentioned, which allows live polymerisation of a monomer. The principle of live polymerisation by RAFT is described in document WO 98/01478. The chain transfer agent together with the monomer to be polymerised are initially placed in a reactor, together with the radical generator, so that the method causes an exchange of functionality on the growing chains (Macromolecules; 10 Jul. 2012, vol 15, n° 13, p 5321-5342). The source of free radicals is then added, heat is applied, and the reaction is continued until a polymer with the expected molecular weight is obtained. It is indeed possible with such a method to accurately control the reaction conditions, so as to obtain a polymer with the desired molecular weight. Such a method also enables to obtain polymers with low polydispersity IP indices (also called polymolecularity index), which makes them particularly efficient for certain applications. Nonetheless, the conversion rates of acrylic acid described in this document are very low.

Documents WO 02/070571 and WO 2005/095466, for their part, describe a controlled radical polymerisation method of acrylic acid by means of sulphurous chain transfer agents, which provides an excellent conversion rate of the monomers to be obtained.

Document WO 2006/024706 describes acrylic acid polymers obtained by RAFT type method and the various uses of these polymers.

More specifically, document WO 02/070571 describes in particular trithiocarbonate compounds of type (I), including dibenzyl trithiocarbonate (II). Documents WO 2005/095466 and WO 2006/024706, for their part, describe very particular water-soluble trithiocarbonates of type (III). The formulas of these compounds are given below.

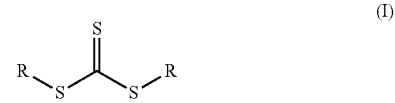
(I)

where R represents an alkyl or aryl chain, which may or may not be substituted.

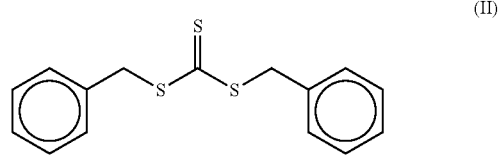
(II)

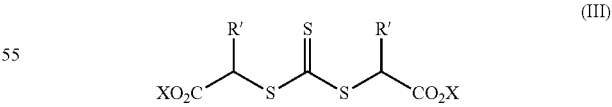
(III)

According to a preferential embodiment described in documents WO 2005/095466 and WO 2006/024706 the X and R' groups are such that:
X represents Na or H and
R' represents an alkyl chain having from 2 to 4 carbon atoms.

To implement a controlled radical polymerisation of RAFT type, and thus obtaining a polymer with the expected molecular weight and a satisfactory IP index, it is important to introduce into the reactive medium an available quantity of chain transfer agent, in other words to add a quantity of chain transfer agent such that each chain to be polymerised is functionalised by a chain transfer agent. In addition, it is important that this chain transfer agent is already available when the polymerisation is initiated, i.e. when the polymerisation reactor is heated and radicals are generated. This implies that substantial quantities of chain transfer agents must be used in a controlled radical polymerisation method of RAFT type.

Despite all the advantages resulting from RAFT polymerisation, the use of such quantities of chain transfer agents has a number of disadvantages.

Firstly, it is established that chain transfer agents are expensive products, which has a significant impact on the cost of the polymer obtained.

In addition, when sulphurous chain transfer agents are used, as described in documents WO 02/070571, WO 2005/095466 and WO 2006/024706, it is observed that the polymer resulting from such a controlled radical polymerisation method of RAFT type carries the chain transfer agent, or some of its residues, in its backbone. This can particularly be revealed by RMN analyses. It is therefore necessary to hydrolyse, for example with sodium hydroxide NaOH, the product resulting from this method, which constitutes an additional step in the method. In addition, we note that a fraction of these compounds will be degraded into free sulphurous by-products of $CS_2$ and $H_2S$ type, and be found in the final aqueous polymer solution, and in the run-off water of the process, which may have a negative impact on human beings and on the environment. In addition, the presence of these sulphurous by-products in the aqueous solution during the polymer use causes gaseous releases, which are harmful for human beings. This is particularly the case when the polymer is used as a dispersing or grinding aid agent of mineral material, for example when calcium carbonate $CaCO_3$ is ground.

Carbon sulphide, of $CS_2$ chemical formula, is a particularly toxic product likely to impair fertility. Hydrogen sulphide, of $H_2S$ chemical formula, is a malodorous acidic gas, which is very harmful for aquatic organisms, and that may be lethal if inhaled. It should also be noted that mercaptans have the same disadvantages as hydrogen sulphide. Regulatory authorities require precise classification of such by-products in polymer solutions likely to contain them, including at relatively low concentration rates.

One object of the present invention is to propose a method which enables to provide an aqueous solution of polymers with fewer carbon sulphide or hydrogen sulphide type by-products, so as to reduce the risks on human beings and on the environment when the polymer is synthesized, but also when the polymer solution is used, especially for mineral material grinding.

Another object of the present invention is to suggest a method for preparing a polymer.

Another object of the present invention is to offer a method for preparing a (meth)acrylic acid polymer with a molecular weight less than 8,000 g/mol, for example less than 7,000 g/mol.

Another object of the present invention is to offer a method for preparing a solvent-free polyacrylic polymer, i.e. which does not generate volatile organic compounds.

Yet another object of the present invention is to offer a method for manufacturing a polymer with a satisfactory IP index, while controlling the costs associated with this method.

Another object of the present invention is to offer a method for manufacturing a polymer which does not carry in its backbone any sulphur or phosphorus atoms derived from the polymerisation reactants, and which has nonetheless a low molecular weight.

Yet another object of the present invention is to reduce the quantity of pollutants in the process waste water, related to the use of reactants including sulphur and phosphorus.

The inventors have discovered, in a surprising manner, a solvent-free preparation method for preparing a polymer of (meth)acrylic acid in solution, where said polymer has a molecular weight less than 8,000 g/mol and a polydispersity IP index between 2 and 3, and which includes the following steps:

a) water, and optionally a water-soluble metal salt-based catalyst, are introduced into a synthesis reactor, b) the reactor is heated to a temperature of at least 60° C., c) the following compounds are continuously and simultaneously introduced into the reactor:

b1) the (meth)acrylic monomer(s) to be polymerised, b2) at least one compound of formula (I):

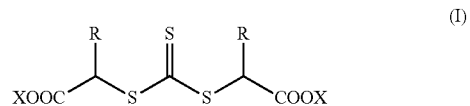

wherein:

X represents Na, K or H, and

R represents an alkyl chain from 1 to 5 carbon atoms b3) a polymerisation initiator system, where the mass percentage (weight/weight) between said compound of formula (I) and said (meth)acrylic monomer(s) is between 0.1 and 2.5%.

Indeed the method of the present invention enables to provide polymers with a molecular weight of less than 8,000 g/mol, for example less than 7,000 g/mol, for example of about 6,000 g/mol.

According to one embodiment of the present invention, the polymers have a molecular weight greater than 500 g/mol, for example greater than 1,000 g/mol.

The aqueous solution of polymers obtained in this manner is characterised in that, without undertaking any required treatment, for example a neutralisation of this solution, a degree of polymeric purity is obtained such that the molar percentage (mole/mole) between the sulphurous polymers of (meth)acrylic acid and the total polymers of (meth)acrylic acid is less than 0.1%, as measured by RMN and diffusion spectroscopy or DOSY method.

DOSY (Diffusion Ordered SpectroscopY) is a two-dimensional RMN technique which enables to determine the structure of organic compounds in a blend without prior physical separation. The molecules are discriminated according to their self-diffusion coefficient D, i.e. according to their hydrodynamic radius. This results in a 2-D map showing marks which correlate each RMN signal to a coefficient D, which enables the RMN spectrum of each of the compounds of the blend to be isolated.

The expression "sulphurous polymers of (meth)acrylic acid" means polymers including a central trithiocarbonate structure, for example with the following formulas:

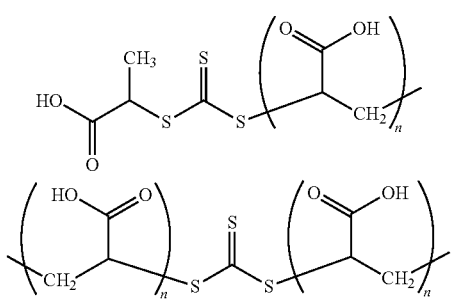

or polymers including thiol chain ends, for example of the following formulae:

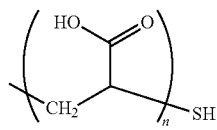

The method of the present invention, which is not a RAFT type radical polymerisation method (firstly, because of the quantity of compounds of formula (I) used and, secondly, because of the introduction order of the reactants into the synthesis reactor) thus enables to obtain an aqueous polymers solution which, advantageously includes, firstly, fewer sulphurous polymers of (meth)acrylic acid than a polymer solution obtained following a RAFT type radical polymerisation method; secondly, the solution obtained by this method includes fewer $H_2S$ or $CS_2$ type reaction by-products than the polymer solution obtained following a RAFT type radical polymerisation method. Although the polydispersity index of the poly(meth)acrylic polymer obtained is higher than the one obtained using a RAFT type radical polymerisation method, such an aqueous solution of polymers obtained according to the method of the present invention has a higher degree of purity than a solution obtained by a RAFT type radical polymerisation method. This higher degree of purity could not have been obtained through the use of a conventional method or by means of purification techniques, such that the aqueous solution of polymers according to the present invention must be recognized as new in relation to the aqueous polymer solutions of the prior art.

The method of the invention thus enables reduced contamination of the polymer obtained, and also reduced production of polluting $CS_2$ or $H_2S$ type by-products, since the mass percentage between the compound of formula (I) and the monomers to be polymerised is reduced to a value between 0.1 and 2.5%.

The method of the present invention also enables to solve one of the major technical problems of the present invention, namely providing a method for preparing a polymer with a molar weight less than 8,000 g/mol, for example less than 6,000 g/mol.

It should also be noted that the method of the invention is a method which does not use solvents, for example secondary alcohols such as isopropanol, or any other solvent likely to generate volatile organic compounds (COV).

The method of the present invention also has the advantage of providing a high rate of conversion within a reaction time which is reasonable for the industry. According to one embodiment of the method according to the invention, the reaction time of step c) is less than 4 hours.

Step c) of the method of the present invention uses at least one compound of the following formula (I):

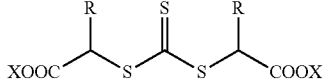

formula (I) according to which:
X represents Na, K or H, and
R represents an alkyl chain having from 1 to 5 carbon atoms.

The expression "alkyl chain having from 1 to 5 carbon atoms" means a methyl, ethyl, propyl, isopropyl, butyl, tert-butyl, isobutyl or pentyl chain.

According to the present invention, the mass percentage (weight/weight) between said chain transfer agent and said (meth)acrylic monomer(s) is between 0.1 and 2.5%.

According to one embodiment of the present invention, the mass percentage (weight/weight) between said compound of formula (I) and said (meth)acrylic monomer(s) is between 0.15 and 2.1%.

According to another embodiment of the present invention, the mass percentage (weight/weight) between said compound of formula (I) and said (meth)acrylic monomer(s) is between 0.15 and 1.5%.

According to one embodiment of the present invention, said compound of formula (I) is compound (IV), i.e. compound (I) in which X represents Na and R represents $CH_3$, and the mass percentage (weight/weight) between said compound of formula (I) and said (meth)acrylic monomer(s) is between 0.1 and 1.75%.

According to another embodiment of the present invention, said compound of formula (I) is compound (IV), i.e. compound (I) in which X represents Na and R represents $CH_3$, and the mass percentage (weight/weight) between said compound of formula (I) and said (meth)acrylic monomer(s) is between 0.15 and 1.5%.

Yet, according to another embodiment of the present invention, said compound of formula (I) is compound (IV), i.e. compound (I) in which X represents Na and R represents $CH_3$, and the mass percentage (weight/weight) between said compound of formula (I) and said (meth)acrylic monomer(s) is between 0.15 and 0.5%.

The constituents are "continuously" introduced into the synthesis reactor, i.e. at a constant or variable speed, but without interrupting the introduction.

The constituents are also "simultaneously" introduced into the synthesis reactor, i.e. the various constituents are introduced at the same time.

According to one embodiment of the method of the present invention, the constituents are "proportionally" introduced into the synthesis reactor, i.e. the proportion of each constituent of the blend introduced into the synthesis reactor remains constant over the reaction time, in relation to the other constituents of the blend.

The expression "the (meth)acrylic monomer(s) to be polymerised" means that the aim of the method of the invention is to manufacture either a polymer consisting exclusively of acrylic acid (a homopolymer of acrylic acid), or a polymer consisting exclusively of a methacrylic acid (a homopolymer of methacrylic acid) or, alternatively, a polymer consisting of a blend of acrylic acid and of methacrylic acid (an acrylic-methacrylic acid copolymer). In the latter case, according to one aspect of the invention, the molar ratio between the acrylic acid and the methacrylic acid can vary between 1:100 and 100:1, for example between 1:1 and 100:1, or between 1:1 and 50:1.

"A polymerisation initiator system" or "polymerisation activator system" means a system able to initiate the polymerisation of the monomers. Conventionally, this consists of a chemical compound able to generate free radicals.

According to one aspect of the present invention, the polymerisation initiator system is chosen from the group consisting of hydrogen peroxide, sodium persulphates, potassium persulphates, ammonium persulphates, hydroperoxides and a blend of at least two of these compounds.

According to another aspect of the present invention, the polymerisation initiator system is hydrogen peroxide, $H_2O_2$.

According to one aspect of the present invention, a water-soluble metal salt-based catalyst, chosen among the group consisting of copper sulphate, iron sulphate and a blend of these compounds, is introduced into the synthesis reactor in step a) of the method.

Yet according to another aspect of the present invention, the mass percentage (weight/weight) between said water-soluble metal salt-based catalyst and said (meth)acrylic monomer(s) is between 0.01 and 3%, for example between 0.5% and 2.5%.

According to another aspect of the present invention, said at least one compound of formula (I) is dipropyl trithiocarbonate (DPTTC, CAS No. 6332-91-8) or its salts, for example its disodium salt (sodium dipropionate trithiocarbonate, CAS No. 86470-33-2), as represented by formula (IV) below:

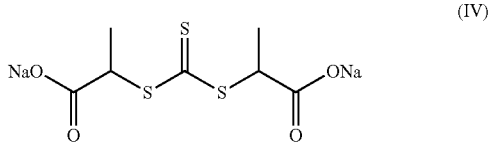

(IV)

Polymers are generally characterised by two indices/magnitudes/values:
  polymolecularity IP index (also indifferently called, polydispersity PD); and
  molecular mass in weight.

The polymolecularity index corresponds to the distribution of the molar masses of the different macromolecules within the polymer. If all the macromolecules are of the same length (and therefore of the same molecular weight), this index is close to 1. If, conversely, the macromolecules are of different lengths (and therefore of different molecular weight), the IP index is greater than 1. For the polymer to constitute an effective dispersing or grinding aid agent of mineral materials, we generally try to move the IP value as close as possible to 1. for example This effectiveness is measured, by the quantity of mineral material likely to be dispersed or ground into water, without the viscosity of the manufactured suspension making this suspension impossible to handle, transport or pump.

According to the present invention, the polymer in solution obtained according to the method described has a molecular mass less than 8,000 g/mol and a polydispersity index IP between 2 and 3.

An RMN analysis combined with diffusion spectroscopy can highlight the possible presence of units derived from formula (I) at the end of the polymer chain according to the invention. The RMN and diffusion spectroscopy methods are known to those skilled in the art.

RMN spectra (1D and 2D) can, for example, be produced using a Bruker AV 500 spectrometer fitted with a TXI (1H/13C/31P) 5 mm probe. The samples are dissolved in deuterated water and examined in RMN $^1$H with presaturation of the water signal and in RMN $^{13}$C: experiments 1D and 2D (simple and long-distance $^1$H/$^{13}$C correlations).

According to one aspect of the present invention, the reaction conditions are such that the rate of conversion of the monomers to be polymerised is greater than 99%.

The quantity of residual monomers (acrylic acid or methacrylic acid) can be evaluated by high-pressure liquid chromatography (CHLP). In this method the components constituting the blend are separated for a stationary phase and detected by a UV detector. After the detector has been calibrated, it is possible, from the area of the peak corresponding to the acrylic compound, to obtain the quantity of residual (meth)acrylic acid.

This method is notably described in the manual "*Chimie Organique Expérimentale*" [Experimental Organic Chemistry], by M. Chavanne, A. Julien, G. J. Beaudoin, E. Flamand, second Edition, Editions Modulo, chapter 18, pages 271-325.

According to another aspect of the present invention, the reaction conditions are such that the rate of conversion of the monomers to be polymerised is greater than 99.5%. In this case, the quantity of residual monomers is less than 0.5% or less than 5,000 ppm.

According to another aspect of the present invention, the reaction conditions are such that the rate of conversion of the monomers to be polymerised is greater than 99.7%. In this case, the quantity of residual monomers is less than 0.3% or less than 3,000 ppm.

According to one aspect of the present invention, according to step b) of the method, the reactor is heated to a temperature of at least 80° C., for example to 95° C.

According to another aspect of the invention, the method includes no step of elimination of reaction by-products after step c) of polymerisation.

The present invention also relates to an aqueous solution of polymers of (meth)acrylic acid, characterised in that it is obtained by the method according to the invention, where said polymers have a molecular weight less than 8,000 g/mol and a polydispersity IP index between 2 and 3, and where the molar percentage (mol/mol) between the sulphurous polymers of (meth)acrylic acid and the total polymers of (meth) acrylic acid are less than 0.1%, as measured by RMN.

According to one aspect of the present invention, this polymer solution contains a quantity of unpolymerised (meth) acrylic monomer(s) less than 2% by weight, as determined by high-performance liquid chromatography (HPLC).

According to one embodiment of the invention, this polymer solution contains a quantity of unpolymerised (meth) acrylic monomer(s) less than 0.3% by weight.

According to another embodiment of the invention, this polymer solution contains a quantity of unpolymerised (meth)acrylic monomer(s) of less than 0.1% by weight.

According to one aspect of the invention, this solution is characterised in that it contains a quantity of $CS_2$ by-products less than 0.1% by weight, as determined by gas chromatography and mass spectroscopy.

According to one embodiment of the invention, this polymer solution contains a quantity of $CS_2$ by-products less than 0.05% by weight, i.e. less than 500 ppm.

According to another embodiment of the invention, this polymer solution contains a quantity of $CS_2$ by-products less than 0.01% by weight, i.e. less than 100 ppm.

yet According to another embodiment, this polymer solution contains a quantity of $CS_2$ by-products of less than 50 ppm.

According to one aspect of the invention, this solution is characterised in that it contains a quantity of $H_2S$ by-products less than 0.01% by weight, as determined by gas chromatography and mass spectroscopy.

Finally, the present invention relates to the different uses of the aqueous solution of polymers according to the invention.

The invention relates in particular to the use of an aqueous solution of polymers of (meth)acrylic acid according to the invention as a grinding aid agent and/or co-grinding aid agent of mineral material.

The expression "mineral material" means a mineral material chosen among the group consisting of natural or synthetic calcium carbonate, the dolomites, limestone, kaolin, talc, gypsum, lime, magnesium, titanium dioxide, satin white, aluminium trioxide or aluminium trihydroxide, the silicas, mica and a blend of these fillers between themselves, such as talc-calcium carbonate, calcium carbonate-kaolin blends, or again blends of calcium carbonate with aluminium trihydroxide or aluminium trioxide, or blends with synthetic or natural fibres, or mineral co-structures such as talc-calcium carbonate or talc-titanium dioxide co-structures, or their blends, and in that said mineral material is chosen preferentially among natural or synthetic calcium carbonate or talc or their blends, and in that they are very preferentially chosen among natural or synthetic calcium carbonate or their blends.

The invention also relates to the use of an aqueous solution of polymers of (meth)acrylic acid according to the invention to disperse particles of mineral material in solution.

According to one embodiment, the aqueous solution of polymers of (meth)acrylic acid as obtained by the method according to the invention is used to disperse particles of calcium carbonate in solution.

The invention also relates to the use of an aqueous solution of polymers of (meth)acrylic acid according to the invention to prepare a suspension of mineral material, for example a calcium carbonate suspension.

EXAMPLES

In each of the following examples the molecular weight of the polymers according to the invention is determined by Gel Permeation Chromatography (GPC).

Such a technique uses a liquid chromatography device of WATERS™ trademark, equipped with a detector. This detector is a refractometric concentration detector of WATERS™ trademark.

This liquid chromatography equipment is fitted with a steric exclusion column appropriately chosen by those skilled in the art in order to separate the different molecular weights of the analysed polymers. The liquid elution phase is an aqueous phase adjusted to pH 9.00 with sodium hydroxide 1N containing 0.05M of NaHCO3, 0.1M of NaNO3, 0.02M of triethanolamine and 0.03% of NaN3.

In a detailed manner, according to a first step, the polymerisation solution is diluted at a 0.9% dry rate in the GPC solubilisation solvent, which corresponds to the GPC's liquid elution phase, to which is added 0.04% of dimethylformamide, which plays the role of flow marker or internal standard. A 0.2 μm filter is then applied. 100 μL is then injected into the chromatography device (eluent: an aqueous phase adjusted to pH 9.00 with sodium hydroxide 1N containing 0.05M of NaHCO3, 0.1M of NaNO3, 0.02M of triethanolamine and 0.03% of NaN3).

The liquid chromatography device contains an isocratic pump (WATERS™ 515) whose flow rate is set to 0.8 ml/min. The chromatography device also includes an oven, which itself includes the following system of columns, in series: a precolumn of the GUARD COLUMN ULTRAHYDROGEL WATERS™ type, measuring 6 cm long and 40 mm internal diameter, and a linear column of ULTRAHYDROGEL WATERS™ type, measuring 30 cm long and 7.8 mm internal diameter. The detection system, in turn, consists of a refractometric detector of RI WATERS™ 410 type. The oven is heated to a temperature of 60° C. and the refractometer is heated to a temperature of 45° C.

The chromatography device is calibrated by standards of powdered sodium polyacrylate of different molecular weights, certified for the supplier: POLYMER STANDARD SERVICE or AMERICAN POLYMER STANDARDS CORPORATION.

The polydispersity IP index of the polymer is the ratio of the mass-average molecular mass in weight Mw to the number-average molecular mass Mn.

The quantity of residual monomers is measured using conventional techniques, known to those skilled in the art, for example high-pressure liquid chromatography (CHLP).

Example 1

The purpose of this example is to illustrate the preparation of (meth)acrylic acid polymers according to the invention, through the use of a dipropionate trithiocarbonate salt (DPTTC) as a weight percentage (weight/weight) between said DPTTC salt and said (meth)acrylic monomer(s) between 0.1 and 2.5% (invention) or outside this range (outside the invention).

Test 1—Prior Art

This test illustrates a method of preparation of a polymer by means of controlled radical polymerisation of RAFT type.

In the synthesis reactor fitted with a mechanical stirring system and a heating system of oil bath type, 328 g of water, 94 g of DPTTC chain transfer agent 29% (that is 27 g of DPTTC 100% or 0.092 mole) are added.

Heat is applied until a temperature of 95° C. is attained.

Over 2 hours, 328 g of acrylic acid 100% (4.558 moles) and, simultaneously with the acrylic acid, the free radicals source, in this case 4 g of sodium persulphate $Na_2S_2O_8$ (0.017 mole) dissolved in 76 g of water and 1.15 g of sodium metabisulphate $Na_2S_2O_5$ (0.006 mole) dissolved in 76 g of water, are poured in.

The temperature is maintained for 2 h, and it is then treated by injecting 3.2 g of hydrogen peroxide 130V diluted with 46 g of water.

The medium is then neutralised while stirring with 381 g of sodium hydroxide 50% diluted with 48 g of water.

Finally, the blend is treated, still at 95° C., with a solution consisting of 7.83 g of sodium persulphate dissolved in 15 g of water and a solution of 5.59 g of hydrogen peroxide, and cooking is then resumed for 1 hour at 95° C., followed by cooling to ambient temperature.

Test 2—Prior Art

According to this test, the conditions of test 1 are reproduced while reducing by a factor of 10 the quantity of DPTTC chain transfer agent used.

In the synthesis reactor fitted with a mechanical stirring system and a heating system of oil bath type, 328 g of water, 19 g of DPTTC chain transfer agent 14% (2.7 g of DPTTC 100% or 0.0092 mole) are added.

Heat is applied until a temperature of 95° C. is attained.

Over 2 hours, 328 g of acrylic acid 100% (4.558 moles) and, simultaneously with the acrylic acid, the free radicals source, in this case 4 g of sodium persulphate $Na_2S_2O_8$ (0.017 mole) dissolved in 76 g of water and 1.15 g of sodium metabisulphate $Na_2S_2O_5$ (0.006 mole) dissolved in 76 g of water, are poured in.

The temperature is maintained for 2 h, and it is then treated by injecting 3.2 g of hydrogen peroxide 130V diluted with 46 g of water.

The medium is then neutralised whilst stirring with 381 g of sodium hydroxide 50% diluted with 48 g of water.

Finally, the blend is treated, still at 95° C., with a solution consisting of 7.83 g of sodium persulphate dissolved in 15 g of water and a solution of 5.59 g of hydrogen peroxide, and cooking is then resumed for 1 hour at 95° C., followed by cooling to ambient temperature.

Test 3—Prior Art

This test corresponds to test 2 of example 2 in document WO 2005/095466.

In the synthesis reactor fitted with a mechanical stirring system and a heating system of oil bath type, 150 g of water, 20.31 g of DPTTC chain transfer agent 14.4% (2.92 g of DPTTC 100%), and 50 g of acrylic acid 100% are added. The free radicals source, in this case 0.4 g of V501, is then added. Heat is applied until a temperature of 95° C. is attained. The temperature is then maintained for 2 h, followed by cooling to ambient temperature.

The medium is then neutralised with 55 g of sodium hydroxide 50%

Test 4—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 1.91 g of 14% DPTTC disodium salt (that is 0.27 g of DPTTC 100%) diluted in 31.1 g of water,
- 35.3 g of hydrogen peroxide 130V diluted in 9.4 g of water and
- 279.9 g of acrylic acid diluted with 31 g of water.

Cooking continues for 1 h 30 at 95° C.

The medium is neutralised with 250 g of sodium hydroxide 50%.

Test 5—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 34.31 g of 14% DPTTC disodium salt (that is 4.80 g of DPTTC 100%) diluted in 34.31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 6—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 3.35 g of 20.9% DPTTC disodium salt (that is 0.70 g of DPTTC 100%) diluted in 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 7—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 6.695 g of 20.9% DPTTC disodium salt (that is 1.4 g of DPTTC 100%) diluted with 31 g of water,
- 35.3 g of hydrogen peroxide 130V diluted in 9.4 g of water and
- 279.9 g of acrylic acid diluted with 31 g of water.

Cooking continues for 1 h 30 at 95° C.

The medium is neutralised with 250 g of sodium hydroxide 50%.

Test 8—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 10.04 g of 20.9% DPTTC disodium salt (that is 2.1 g of DPTTC 100%) diluted with 31 g of water,
- 35.3 g of hydrogen peroxide 130V diluted in 9.4 g of water and
- 279.9 g of acrylic acid diluted with 31 g of water.

Cooking continues for 1 h 30 at 95° C.

The medium is neutralised with 250 g of sodium hydroxide 50%.

Test 9—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 13.39 g of 20.9% DPTTC disodium salt (that is 2.8 g of DPTTC 100%) diluted with 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 10—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 16.7 g of 20.9% DPTTC disodium salt (that is approximately 3.5 g of DPTTC 100%) diluted with 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 11—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 20.1 g of 20.9% DPTTC disodium salt (that is 4.2 g of DPTTC 100%) diluted with 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 12—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 23.43 g of 20.9% DPTTC disodium salt (that is 4.9 g of DPTTC 100%) diluted with 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 13—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 26.78 g of 20.9% DPTTC disodium salt (that is 5.6 g of DPTTC 100%) diluted with 31 g of water,
- 35.3 g of hydrogen peroxide 130V diluted with 9.4 g of water and
- 279.9 g of acrylic acid diluted with 31 g of water.

Cooking continues for 1 h 30 at 95° C.

The medium is neutralised with 250 g of sodium hydroxide 50%.

Test 14—Invention

In a synthesis reactor fitted with a mechanical stirring system and a heating system of oil bath type, 213.4 g of water, 0.27 g of iron sulphate heptahydrate and 0.32 g of copper sulphate pentahydrate are added.

The medium is heated to 95° C., then the following elements are simultaneously and continuously added, over 2 hours:
- a stock solution of 33.476 g of 20.9% DPTTC disodium salt (that is 7 g of DPTTC 100%) diluted in 31 g of water,
- 35.3 g of hydrogen peroxide 130V diluted in 9.4 g of water and
- 279.9 g of acrylic acid diluted in 31 g of water.

Cooking continues for 1 h 30 at 95° C.

The medium is neutralised with 250 g of sodium hydroxide 50%.

| Test n° | INVention Prior Art | % by mass DPTTC/ monomers | Mw (g/mole) | IP | pH | PA residuals (ppm) |
|---|---|---|---|---|---|---|
| 1 | PA | 8.23 | 5,065 | 1.5 | 9 | 500 |
| 2 | PA | 0.82 | 43,400 | 3.5 | 8.5 | 113 |
| 3 | PA | 5.8 | 4,947 | 1.55 | 9 | |
| 4 | INV | 0.10 | 8,925 | 3 | 8 | 86 |
| 5 | INV | 1.71 | 3,800 | 2.2 | 8.4 | 7,650 |
| 6 | INV | 0.25 | 6,595 | 2.7 | 7.5 | 340 |
| 7 | INV | 0.50 | 6,475 | 2.9 | 8.2 | 360 |
| 8 | INV | 0.75 | 5,040 | 2.5 | 7.9 | 1,200 |
| 9 | INV | 1.0 | 4,615 | 2.3 | 7.9 | 2,660 |
| 10 | INV | 1.25 | 4,540 | 2.4 | 8 | 4,196 |
| 11 | INV | 1.5 | 4,175 | 2.3 | 8 | 3,084 |
| 12 | INV | 1.75 | 3,930 | 2.2 | 8.1 | 5,245 |
| 13 | INV | 2.0 | 3,965 | 2.2 | 7.9 | 5,125 |
| 14 | INV | 2.5 | 3,225 | 2.2 | 8 | 8,233 |

Example 2

The purpose of this example is to illustrate the isopropanol, carbon sulphide and hydrogen sulphide contents of different samples using polymer solutions of the prior art or polymer solutions according to the present invention.

The analyzes of the different samples are made using Agilent G1530 gas chromatography coupled with an Agilent G2577A mass spectrometer as a detector. The injection is made using an Agilent G1888 head-space. A 30 m×0.25 mm×1 μm Agilent HP5 column is used (5% phenyl and 95% methylsiloxane phase), which allows elution of the analyzes. The analysis is undertaken from 2 grams of the samples as they are. Quantification is accomplished by the standard addition method.

Test 1—Polymer Solution 3 syntheses are made:
- a polyacrylic dispersing agent prepared using a polymerisation method in isopropanol; Mw=5,500; IP=2.4
- a polyacrylic dispersing agent prepared using a controlled radical polymerisation method of RAFT type, according to test 1 of example 1 above (without post-treatment), with the dipropionate trithiocarbonate (DPTTC) as the chain transfer agent in a mass percentage (weight/weight) between said DPTTC compound and the acrylic acid monomers equal to 8.23%; Mw=5,065; IP=1.5
- a polymer solution of the polyacrylic acid prepared using a method according to the present invention, according to test 8 of example 1 above, with the dipropionate trithiocarbonate (DPTTC) as the compound of formula (I) in a mass percentage (weight/weight) between said DPTTC compound and the acrylic acid monomers equal to 0.75%; Mw=5040; IP=2.5.

Samples 1, 2 and 3 respectively are obtained.

The results of these sample analyses are recorded in table 1 below.

TABLE 1

| Samples | INVention Prior Art | Isopropanol content (ppm) | $H_2S$ content (ppm) | $CS_2$ content (ppm) |
|---|---|---|---|---|
| 1 | PA - iso | 2000 | nd | nd |
| 2 | PA - RAFT | nd | 200 | 1000 |
| 3 | INV | nd | nd | nd |

The analysis of sample 1, i.e. a polyacrylic dispersing agent prepared using a prior art method with isopropanol, indicates a high residual isopropanol content (2,000 ppm).

The analysis of sample 2, i.e. a polyacrylic dispersing agent obtained by means of a RAFT method, indicates substantial contents of $H_2S$ and $CS_2$ sulphurous by-products, which constitutes a major disadvantage due to their toxicity.

The analysis of sample 3, i.e. a polyacrylic acid polymer solution prepared using a method according to the present invention, shows that isopropanol, $H_2S$ and $CS_2$ contents are non-detectable. Risks for human beings and for the environment in the course of the polymer synthesis, but also during the use of the polymeric solution, notably the grinding of mineral material, are thus substantially reduced.

Test 2—Calcium Carbonate Suspension

Three calcium carbonate suspensions are prepared, from a 76% coarse calcite concentration (Omya), each containing 1.1 wt. % (dry/dry) of the following dispersing agent:

3 syntheses are made:
- a polyacrylic dispersing agent prepared using a polymerisation method in isopropanol; Mw=5,500; IP=2.4
- a polyacrylic dispersing agent prepared using a controlled radical polymerisation method of RAFT type, according to test 1 of example 1 above (without post-treatment), with dipropionate trithiocarbonate (DPTTC) as a chain transfer agent in a mass percentage (weight/weight) between said DPTTC compound and the acrylic acid monomers that is equal to 8.23%; Mw=5,065; IP=1.5
- a dispersing agent which is a polymer solution of the polyacrylic acid prepared using a method according to the present invention, according to test 8 of example 1 above, with dipropionate trithiocarbonate (DPTTC) as a compound of formula (I) in a mass percentage (weight/weight) between said DPTTC compound and acrylic acid monomers that is equal to 0.75%; Mw=5040; IP=2.5.

Samples 4, 5 and 6 are respectively obtained.

Test 3—Use of Polymer Solutions for Grinding Calcium Carbonate

This test illustrates the use of different polymer solutions as grinding aid agents of mineral material and more specifically of calcium carbonate. Three calcium carbonate suspensions are prepared, from a 76% coarse calcite concentration (Omya), each containing 0.6 wt. % (dry/dry) of the following agent:

3 syntheses are made:
- an agent of polyacrylic acid polymer type prepared using a polymerisation method in isopropanol; Mw=5,500; IP=2.4
- an agent of polyacrylic acid polymer type, prepared using a controlled radical polymerisation method of RAFT type, according to test 1 of example 1 above (without post-treatment), with dipropionate trithiocarbonate (DPTTC) as a chain transfer agent in a mass percentage (weight/weight) between said DPTTC compound and acrylic acid monomers that is equal to 8.23%; Mw=5,065; IP=1.5
- a polymer solution of polyacrylic acid prepared using a method according to the present invention, according to test 8 of example 1 above, with dipropionate trithiocarbonate (DPTTC) as a compound of formula (I) in a mass percentage (weight/weight) between said DPTTC compound and acrylic acid monomers that is equal to 0.75%; Mw=5040; IP=2.5.

The dose of grinding aid agents is increased to 1.1 wt. % by successive additions during the grinding period, using a grinder of Dyno MILL type, of KDL Pilote 1.4L type, containing 2.850 g of VERAC beads (Ø0.6-1.0 mm).

The grinding is continued until we obtain a suspension refined to 76% concentration, and among which approximately 80% of the particles have an equivalent spherical diameter less than 1 μm, is obtained.

The temperature of the suspension is maintained below 55° C. during the entire experiment. The beaker containing the slurry is covered by an aluminium film in order to restrict the release of volatile compounds into the atmosphere.

The samples are stored in flasks filled so as to leave no void volume that may contain air.

Samples 7, 8 and 9 are respectively obtained.

Results

The results of samples 4 to 9 analyses are recorded in table 2 below.

TABLE 2

| Samples | INVention Prior Art | Grinding | Isopropanol content (ppm) | $CS_2$ content (ppm) |
|---|---|---|---|---|
| 4 | PA - iso | before | 100 | nd |
| 5 | PA - iso | after | 75 | nd |
| 6 | PA - RAFT | before | nd | 20 |
| 7 | PA - RAFT | after | nd | 8 |
| 8 | INV | before | nd | nd |
| 9 | INV | after | nd | nd |

The analysis of samples 8 and 9, i.e. a calcium carbonate suspension containing a polyacrylic acid polymer solution prepared using a method according to the present invention, shows that isopropanol and $CS_2$ contents are non-detectable before and after grinding. Risks for human beings and for the environment during the polymeric solution use for the grinding of mineral material are thus substantially reduced. However, a reduction of the isopropanol content is observed during grinding (difference between samples 4 and 5), which indicates a release of VOC. A reduction of $CS_2$ content is also observed during grinding (difference between samples 6 and 7), which shows that $CS_2$ was released during the grinding of calcium carbonate.

The invention claimed is:

1. An aqueous solution comprising water and a (meth)acrylic acid polymer, wherein:
   said (meth)acrylic acid polymer has a molecular weight of less than 8,000 g/mol and a polydispersity IP index of 2-3,
   said solution comprises a molar percentage (mol/mol) of sulphurous polymers of (meth)acrylic acid that is less than 0.1% based on the total amount of (meth)acrylic acid polymer, as measured by RMN, and said aqueous solution is prepared by a method for the organic solvent-free preparation of a (meth)acrylic acid polymer in solution comprising:
a) introducing water, and optionally a water-soluble metal salt-based catalyst, into a synthesis reactor,
b) heating the synthesis reactor to a temperature of at least 60° C.,
c) continuously and simultaneously introducing into the reactor:
   b1) a (meth)acrylic acid monomer,
   b2) a compound of formula (I):

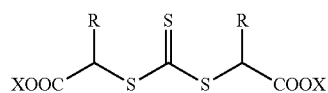

(I)

wherein:
   X represents Na, K or H, and
   R represents an alkyl chain having from 1 to 5 carbon atoms, and
   b3) a polymerisation initiator,
where the mass percentage (weight/weight) between the compound of formula (I) and the (meth)acrylic acid monomer is 0.1-2.5%.

2. The aqueous solution according to claim 1, wherein the mass percentage (weight/weight) between said compound of formula (I) and said (meth)acrylic acid monomer is 0.15-1.5%.

3. The aqueous solution according to claim 1, wherein in the compound of formula (I) R is $CH_3$ and X is Na, and the mass percentage (weight/weight) between said compound of formula (I) and said (meth)acrylic acid monomer is 0.15-0.5%.

4. The aqueous solution according to claim 1, wherein the polymerisation initiator is hydrogen peroxide.

5. The aqueous solution according to claim 1, wherein a water-soluble metal salt-based catalyst is introduced into the synthesis reactor.

6. The aqueous solution according to claim 5, wherein the water-soluble metal salt-based catalyst is selected from the group consisting of copper sulphate, iron sulphate and a mixture thereof.

7. The aqueous solution according to claim 5, wherein the mass percentage (weight/weight) between said water-soluble metal salt-based catalyst and said (meth)acrylic acid monomer is 0.01-3%.

8. The aqueous solution according to claim 6, wherein the mass percentage (weight/weight) between said water-soluble metal salt-based catalyst and said (meth)acrylic acid monomer is 0.5-2.5%.

9. The aqueous solution according to claim 1, wherein said method comprises no step of elimination of reaction by-products after c).

10. The aqueous solution according to claim 1, wherein said solution comprises a quantity of unpolymerized (meth) acrylic monomer that is less than 2% by weight, as determined by high-performance liquid chromatography (HPLC).

11. The aqueous solution according to claim 1, wherein said solution comprises a quantity of $CS_2$ by-product that is less than 0.1% by weight, as determined by gas chromatography and mass spectroscopy.

12. The aqueous solution according to claim 1, wherein all of a)-c) are conducted in the absence of organic solvent.

13. The aqueous solution according to claim 1, wherein all steps of said method are conducted in the absence of organic solvent.

14. A composition comprising the aqueous solution of claim 1 and a mineral material.

15. The composition according to claim 14, wherein the mineral material is one or more selected from the group consisting of natural and synthetic calcium carbonate, dolomite, limestone, kaolin, talc, gypsum, lime, magnesium, titanium dioxide, satin white, aluminium trioxide, aluminium trihydroxide, silica, and mica.

16. The composition according to claim 15, wherein the mineral material is one or more selected from the group consisting of natural and synthetic calcium carbonate and dolomite.

17. The composition according to claim 15, wherein the mineral material is kaolin.

* * * * *